UNITED STATES PATENT OFFICE.

CHARLES EUGENE POSTLETHWAITE, OF LONDON, ENGLAND.

COMPOUND FOR CLEANING WOOD.

SPECIFICATION forming part of Letters Patent No. 602,519, dated April 19, 1898.

Application filed March 24, 1897. Serial No. 629,064. (No specimens.) Patented in England July 4, 1895, No. 12,930.

*To all whom it may concern:*

Be it known that I, CHARLES EUGENE POSTLETHWAITE, oil-refiner, a subject of the Queen of Great Britain, residing at No. 11 Peak Hill, Sydenham, London, in the county of Kent, England, have invented a new or Improved Compound for Cleansing Varnished and Polished Wood Surfaces, (for which I have received Letters Patent in Great Britain, No. 12,930, dated July 4, 1895,) of which the following is a specification.

My said invention relates to a new or improved compound for cleansing varnished and polished wood surfaces, and is applicable more especially to the outside paneling of railway-carriages, where the matter to be removed has generally combined with it a quantity of sulfur given off from the locomotive-furnace.

In carrying the invention into effect a compound is prepared composed of the following ingredients in or in about the proportions stated, namely: Hydrochloric acid and glycerin are combined in the proportion of about three parts, by volume, of hydrochloric acid to one part, by volume, of glycerin, and to a quantity equal to seventy ounces, by weight, of this mixture is added the flour or meal of any suitable cereal, such as wheat, in about the proportion of thirty ounces, by weight, of the flour to seventy ounces, by weight, of the mixture of hydrochloric acid and glycerin. These ingredients are thoroughly mixed by the aid of any suitable means, such as a mixing-machine, and the compound is then run off or decanted into bottles or other receptacles for use as required.

It may be stated that chemical action takes place between hydrochloric acid and glycerin when they are mixed. That chemical action goes on when these two substances are mixed is evidenced by the raising of the temperature of the mixture by their interaction. The nature of the chemical action is rather complicated, but it has been shown that there are formed four different substances in varying quantities—first, $\alpha$ chlorhydrin; second, $\beta$ chlorhydrin; third, $\alpha$ dichlorhydrin; fourth, $\beta$ dichlorhydrin. At a temperature of 100° these substances are produced in large quantities; at ordinary temperatures, in smaller quantities. They are all liquid substances. These substances are powerful solvents like glycerin. There is still left in the compound some glycerin in the original condition, which will dissolve sodium hydrate, potassium hydrate, lead oxids, many sulfates and chlorids, and such salts as washing-soda, alum, sugar of lead, iodin, phosphorus, and sulfur. Hydrochloric acid dissolves flour, forming a solution possessing a more syrupy consistency than the original acid. This is due to the action of the acid upon the starch-granules of the flour. At the same time chemical change goes on, producing such substances as destrin, a gummy substance, along with maltose and dextrose, all of which will undoubtedly increase the syrupy consistency or viscosity of the present compound. The albumen in the flour would be dissolved out partly and go into the solution. This is the soluble albumen; but there is in flour an insoluble albumen called "gluten fibrin," which is even insoluble in acids. This is the part which would help to increase the viscosity of the present compound and leave on the article cleaned by it a smooth surface or gloss. This is pointed out because the addition of hydrochloric acid to glycerin renders the glycerin less syrupy. In other words, it decreases the viscosity. Glycerin being a powerful solvent exercises this action upon the flour. This can be shown by adding flour to glycerin and allowing to stand several hours. It goes into solution and the viscosity is increased.

In applying the compound, which is of a creamy consistency, to the surface to be cleansed it is laid on by means of a brush after the manner of paint or varnish until such surface is completely coated, and this coating is allowed to remain undisturbed for a period which may vary from about a quarter of an hour to about two hours, more or less, according to the nature of the dirt or matter to be removed and the age of the deposit. The coating of the compound at the end of this time is washed off with water, preferably warm water, by the aid of a brush, when it will carry with it all extraneous matter, leaving the varnished or polished surface of the wood in a state of purity.

After the washing of the compound, as hereinbefore described, the cleansed surface may be dried by the aid of cloths or wash-leathers or allowed to dry and afterward polished by the aid of cloths or the like.

By reason of the method of applying and removing the compound—that is to say, by laying it on with a brush and simply washing it off—there is no danger of marking the surface, but any injury thereto is avoided, and after the removal of the same the surface is left bright and glossy.

In order to impart an extra gloss to the finished surface, the compound may have combined therewith a suitable quantity of either natural or artificial albumen, and this may conveniently be added thereto in combination with the hydrochloric acid before admixture of the latter with the glycerin in the proportion of about five per cent., by weight, of the albumen to the hydrochloric acid.

Although the invention is intended for use more especially in connection with railway-carriages it will be evident that it may also be usefully employed as a cleanser for household furniture, road-carriages, and the like.

Having now particularly described and ascertained the nature of my said invention and in what manner the same is to be performed, I declare that what I claim is—

1. A compound for cleansing varnished or polished wood surfaces, resulting from the mixing of hydrochloric acid and glycerin with the addition of the flour of a cereal preferably wheat, substantially as herein described.

2. A compound for cleansing varnished or polished wood surfaces, resulting from the mixing of a mixture of hydrochloric acid and glycerin combined in about the proportions of three parts by volume of the former to one part by volume of the latter, and to which mixture is added a suitable cereal flour in about the proportions of thirty ounces by weight of the flour to seventy ounces by weight of the mixture, substantially as herein described.

CHARLES EUGENE POSTLETHWAITE.

Witnesses:
GEO. S. VAUGHAN,
W. M. HARRIS.